United States Patent
Thubert et al.

(10) Patent No.: US 11,930,541 B2
(45) Date of Patent: Mar. 12, 2024

(54) COORDINATING BEST EFFORT TRAFFIC TO AN ASSOCIATIONLESS, OVERHEAD MESH OF ACCESS POINTS

(71) Applicant: Cisco Technology, Inc., San Jose, CA (US)

(72) Inventors: Pascal Thubert, Roquefort les Pins (FR); Domenico Ficara, Essertines-sur-Yverdon (CH); Alessandro Erta, Licciana Nardi (IT); Amine Choukir, Lausanne (CH); Patrick Wetterwald, Mouans Sartoux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 29 days.

(21) Appl. No.: 17/683,833

(22) Filed: Mar. 1, 2022

(65) Prior Publication Data
US 2023/0284288 A1    Sep. 7, 2023

(51) Int. Cl.
  H04W 74/08   (2009.01)
  H04W 48/20   (2009.01)
  H04W 72/02   (2009.01)

(52) U.S. Cl.
  CPC ......... *H04W 74/085* (2013.01); *H04W 48/20* (2013.01); *H04W 72/02* (2013.01)

(58) Field of Classification Search
  None
  See application file for complete search history.

(56) References Cited

U.S. PATENT DOCUMENTS

| 7,054,329 | B2 | 5/2006 | Cervello et al. |
| 9,769,708 | B2 | 9/2017 | Bisti et al. |
| 10,292,116 | B2 | 5/2019 | Kim et al. |
| 10,356,664 | B2 | 7/2019 | Viger et al. |
| 10,356,757 | B2 | 7/2019 | Choi et al. |
| 10,367,623 | B2 | 7/2019 | Thubert et al. |
| 10,524,194 | B2 | 12/2019 | Thubert et al. |
| 10,735,924 | B2 | 8/2020 | Thubert et al. |
| 10,757,647 | B2 | 8/2020 | Thubert et al. |

(Continued)

OTHER PUBLICATIONS

Guizzo, Erico, "Kiva Systems: Three Engineers, Hundreds of Robots, One Warehouse", online: https://spectrum.ieee.org/three-engineers-hundreds-of-robots-one-warehouse#toggle-gdpr, Jul. 2, 2008, 9 pages, IEEE Spectrum.

(Continued)

*Primary Examiner* — Benjamin Lamont
(74) *Attorney, Agent, or Firm* — BEHMKE INNOVATION GROUP LLC; James M. Behmke; James J. Wong

(57) ABSTRACT

In one embodiment, an access point of an overhead mesh of access points in an area selects a range of client identifiers. The access point sends, via a beam cone transmitted in a substantially downward direction towards a floor of the area, a trigger signal that includes the range of client identifiers and prompts client devices having identifiers in that range to send best effort transmissions towards the overhead mesh. The access point detects a collision between the best effort transmissions of the client devices. The access point adjusts the range of client identifiers so as to avoid future collisions between the best effort transmissions of the client devices.

18 Claims, 14 Drawing Sheets

(56) References Cited

U.S. PATENT DOCUMENTS

| | | | | |
|---|---|---|---|---|
| 11,558,089 | B1* | 1/2023 | Sung | H04B 7/0408 |
| 2016/0269930 | A1* | 9/2016 | Huang | H04W 8/005 |
| 2017/0064708 | A1* | 3/2017 | Noh | H04W 74/0816 |
| 2017/0208479 | A1* | 7/2017 | Takeda | H04B 7/0617 |
| 2018/0288743 | A1* | 10/2018 | Choi | H04L 5/0094 |
| 2020/0259896 | A1* | 8/2020 | Sachs | H04L 63/0823 |
| 2021/0185640 | A1 | 6/2021 | Segev et al. | |
| 2023/0095005 | A1* | 3/2023 | Han | H04W 72/56 370/329 |

OTHER PUBLICATIONS

"LoRa", online: https://en.wikipedia.org/wiki/LoRa, Dec. 6, 2021, accessed Jan. 3, 2022, 4 pages, Wikimedia Foundation, Inc.

"Li-Fi", online: https://en.wikipedia.org/wiki/Li-Fi, Dec. 24, 2021, accessed Jan. 3, 2022, 8 pages, Wikimedia Foundation, Inc.

"Time Slotted Channel Hopping", online: https://en.wikipedia.org/wiki/Time_Slotted_Channel_Hopping, 3 pages, Dec. 17, 2021, accessed Jan. 3, 2022, Wikimedia Foundation, Inc.

Dolnak, et al., "Using IPv6 protocol in V2X networks based on IEEE 802.11-OCB mode of operation", Proc. of the 2nd International Conference on Electrical, Communication and Computer Engineering (ICECCE), 4 pages, Jun. 12-13, 2020, Istanbul, Turkey.

"5G Terminology: The gNB", online: https://www.5g-networks.net/5g-technology/5g-terminology-the-gnb/, May 24, 2019, 2 pages.

"Directional Antenna", online: https://en.wikipedia.org/wiki/Directional_antenna, Nov. 1, 2021, accessed Jan. 4, 2022, 4 pages, Wikimedia Foundation, Inc.

"IEEE 802.11p", online: https://en.wikipedia.org/wiki/IEEE_802.11p, Nov. 26, 2021, 3 pages, Wikimedia Foundation, Inc.

"LoRaWAN is Secure (but Implementation Matters)", online: https://lora-alliance.org/resource_hub/lorawan-is-secure-but-implementation-matters/, accessed Jan. 28, 2022, 3 pages, LoRa Alliance.

Vilajosana, et al., "IETF 6TiSCH: A Tutorial", Communications Surveys and Tutorials, IEEE Communications Society, Institute of Electrical and Electronics Engineers, In press, Dec. 20, 2019, 22 pages.

"Neighbor Discovery Protocol", online: https://en.wikipedia.org/wiki/Neighbor_Discovery_Protocol, Jan. 11, 2022, 3 pages, Wikimedia Foundation, Inc.

"Random-Access Channel", online: https://en.wikipedia.org/wiki/Random-access_channel, Jul. 10, 2021, 1 page, Wikimedia Foundation, Inc.

Thubert, et al., "Registration Extensions for IPv6 over Low-Power Wireless Personal Area Network (6LoWPAN) Neighbor Discovery", Request for Comments: 8505, Nov. 2018, 47 pages, IETF Trust.

* cited by examiner

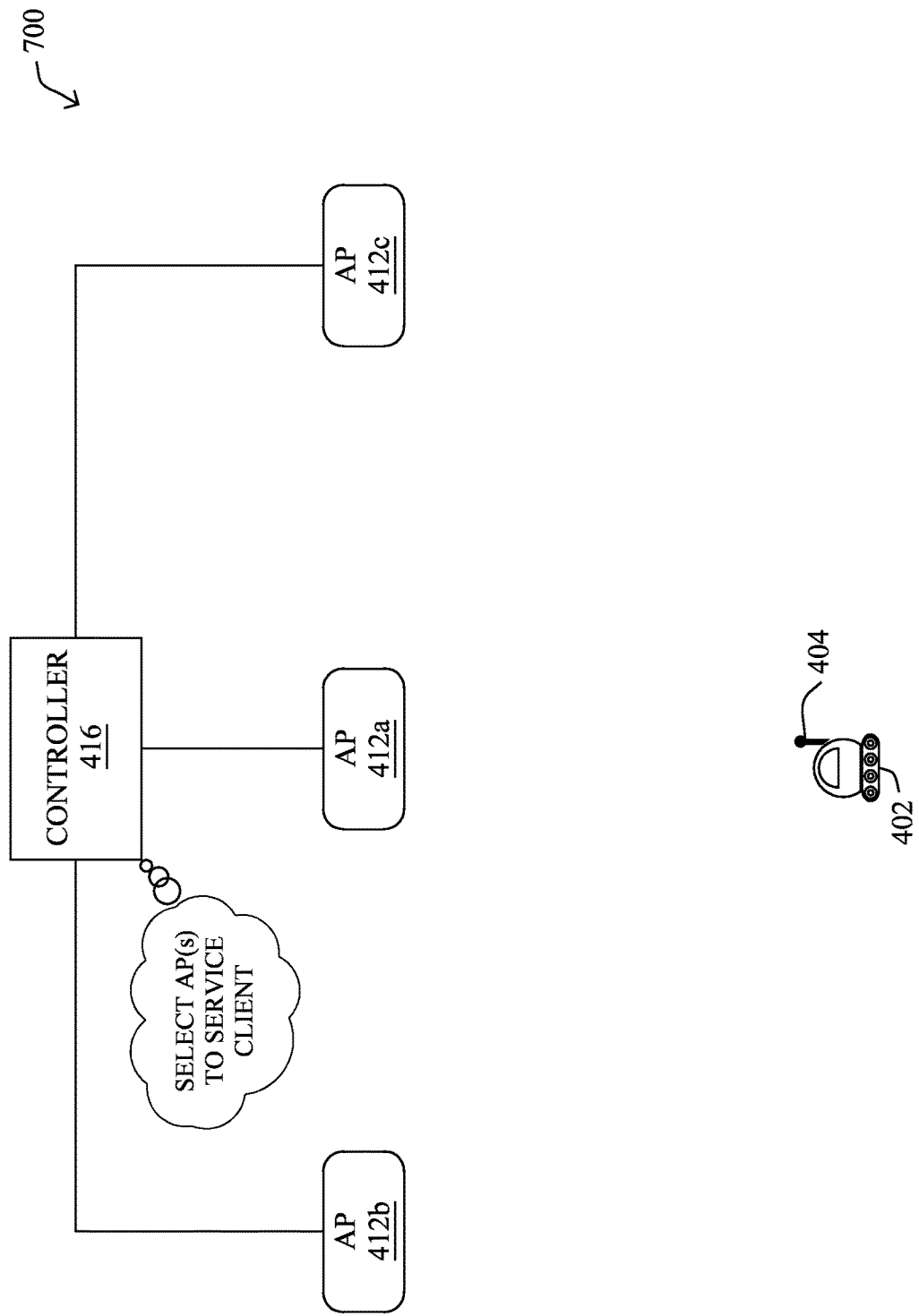

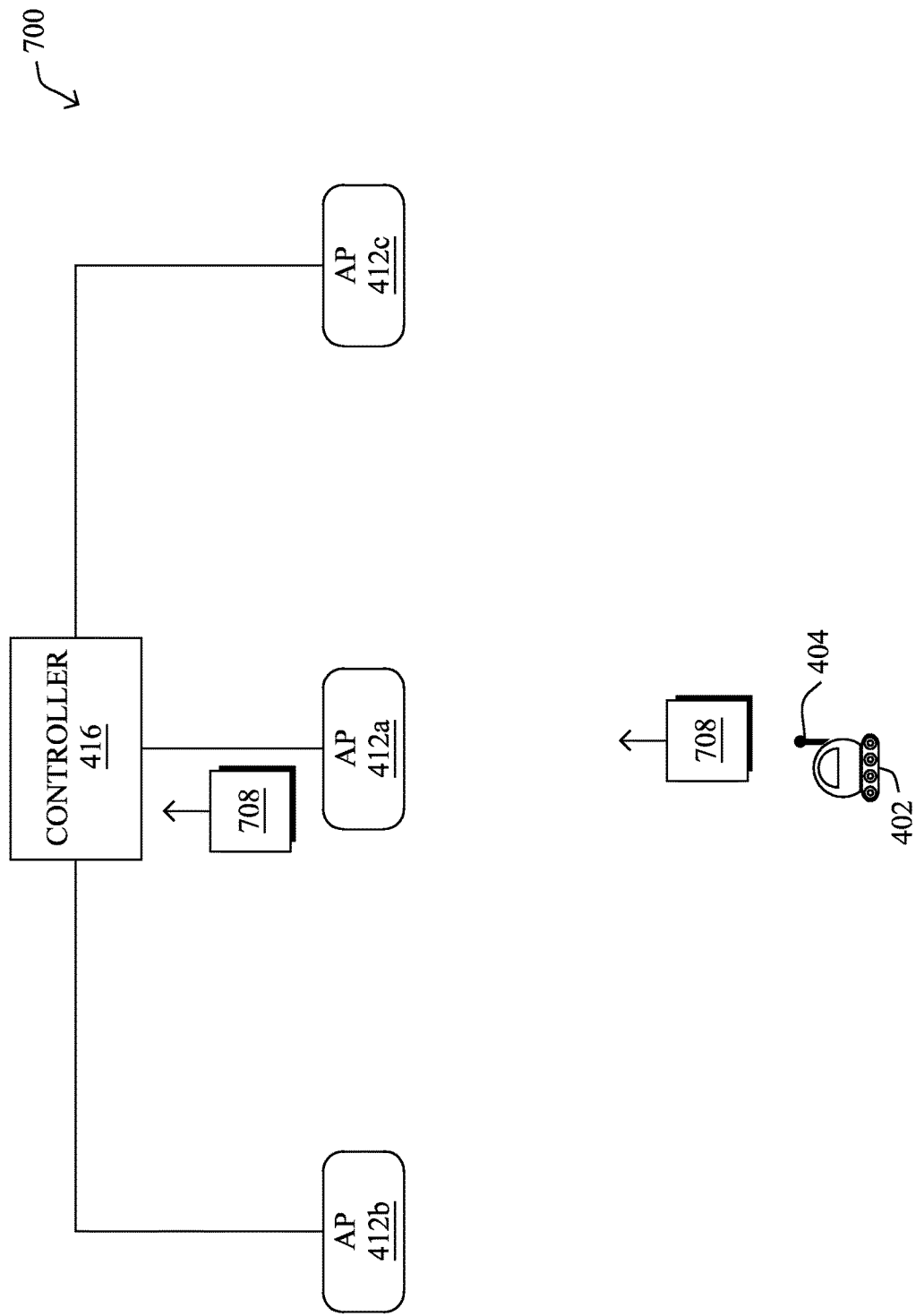

COORDINATING BEST EFFORT TRAFFIC TO AN ASSOCIATIONLESS, OVERHEAD MESH OF ACCESS POINTS

TECHNICAL FIELD

The present disclosure relates generally to computer networks, and, more particularly, to coordinating best effort traffic to an associationless, overhead mesh of access points.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. In other words, the IoT has expanded to include many operational technology (OT) networks, as well.

Traditionally, many OT networks have relied on wired networking solutions. This is primarily due to the potential for error, should a wireless solution be adopted. For instance, consider the case of a factory. Any errors in the wireless communications in such a setting could disrupt the manufacturing process (e.g., a by failing to provide a control command to an actuator, by failing to provide sensor data to a controller, etc.).

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7F illustrate an example of ceiling-controlled communication scheduling in an overhead mesh of access points.

DESCRIPTION OF EXAMPLE EMBODIMENTS

Overview

Figure 1:
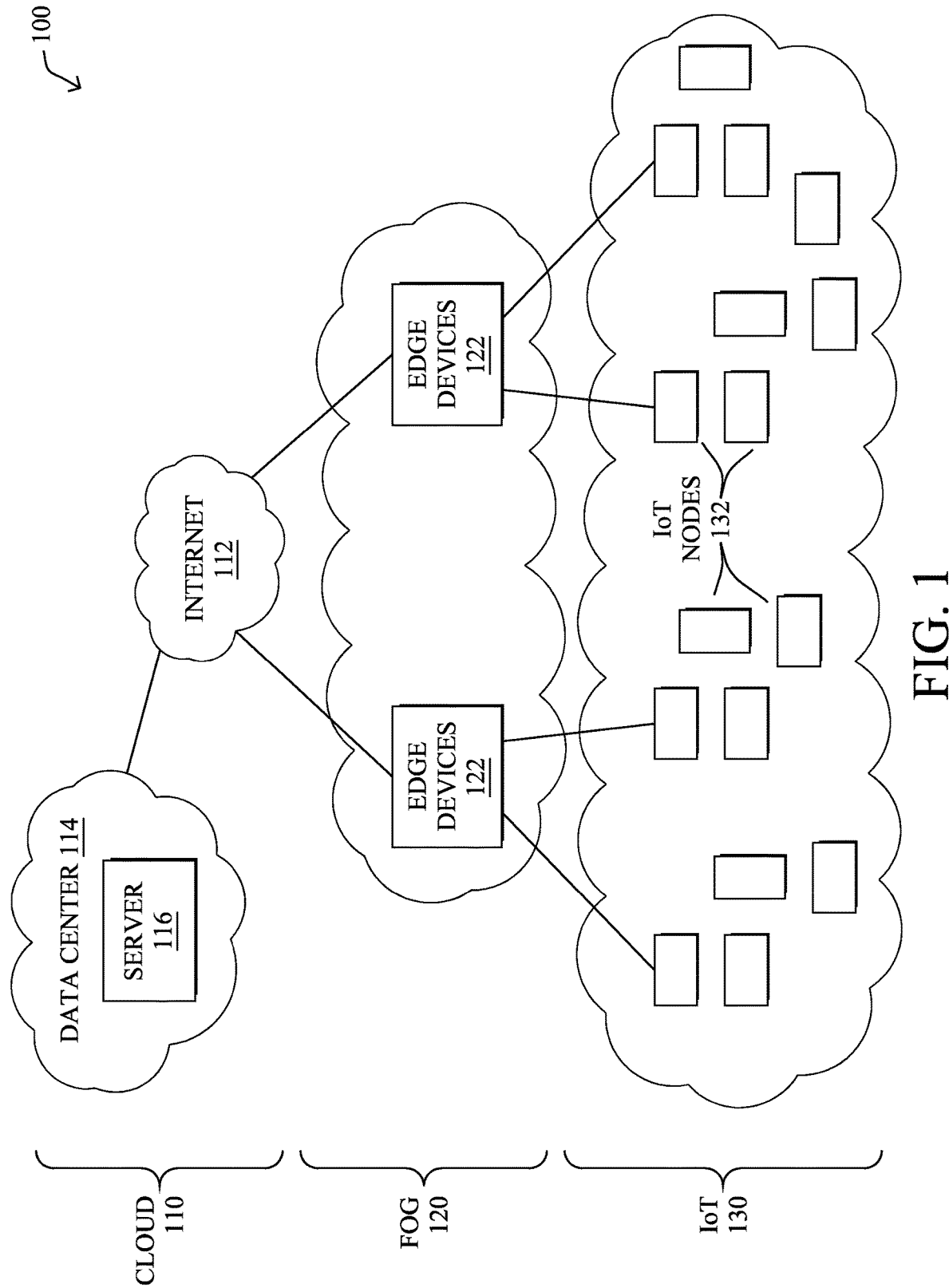
FIG. 1 illustrate an example network.

According to one or more embodiments of the disclosure, an access point of an overhead mesh of access points in an area selects a range of client identifiers. The access point sends, via a beam cone transmitted in a substantially downward direction towards a floor of the area, a trigger signal that includes the range of client identifiers and prompts client devices having identifiers in that range to send best effort transmissions towards the overhead mesh. The access point detects a collision between the best effort transmissions of the client devices. The access point adjusts the range of client identifiers so as to avoid future collisions between the best effort transmissions of the client devices.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
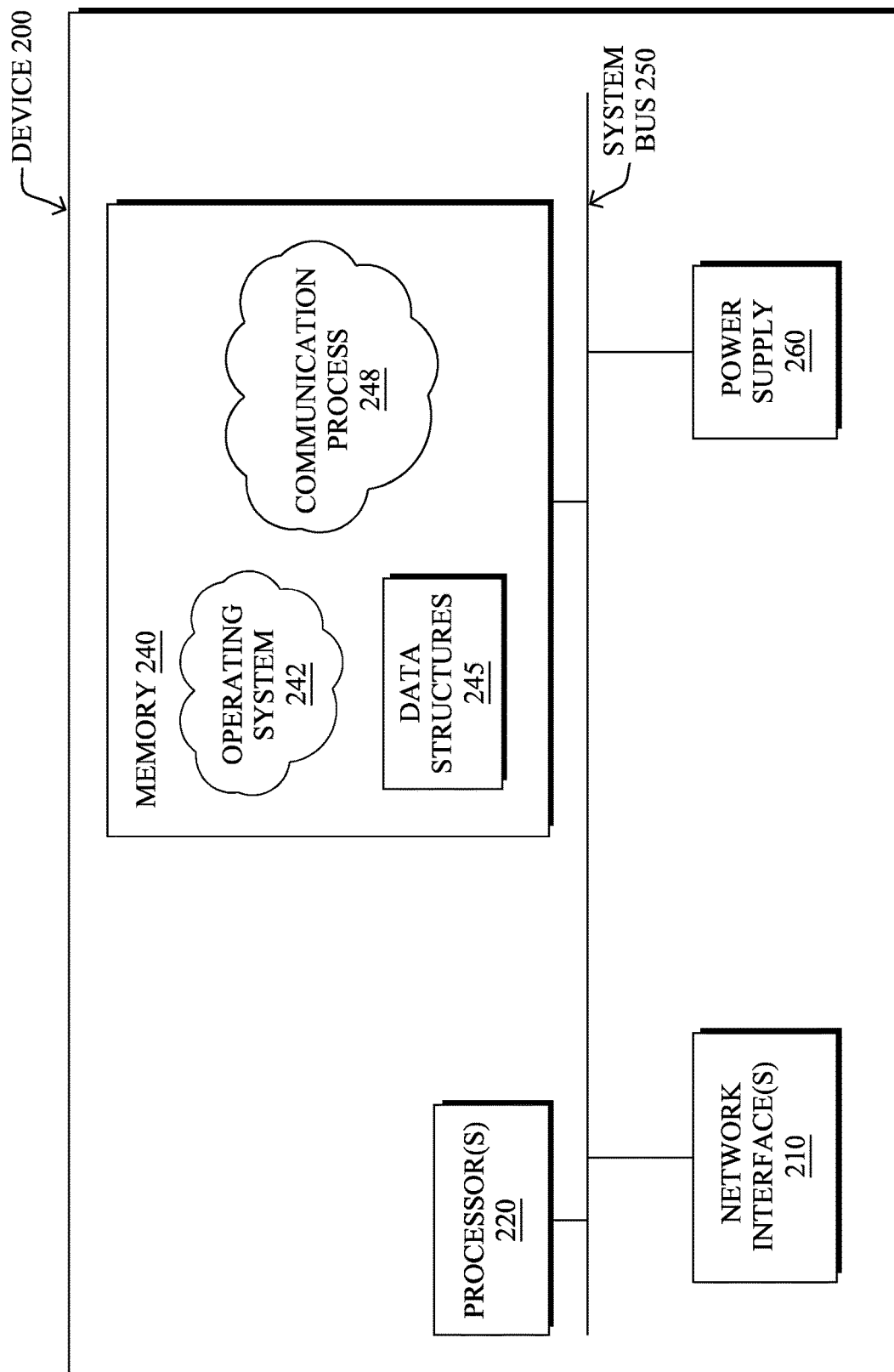
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below (e.g., a client device, an access point, a network controller, etc.). The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
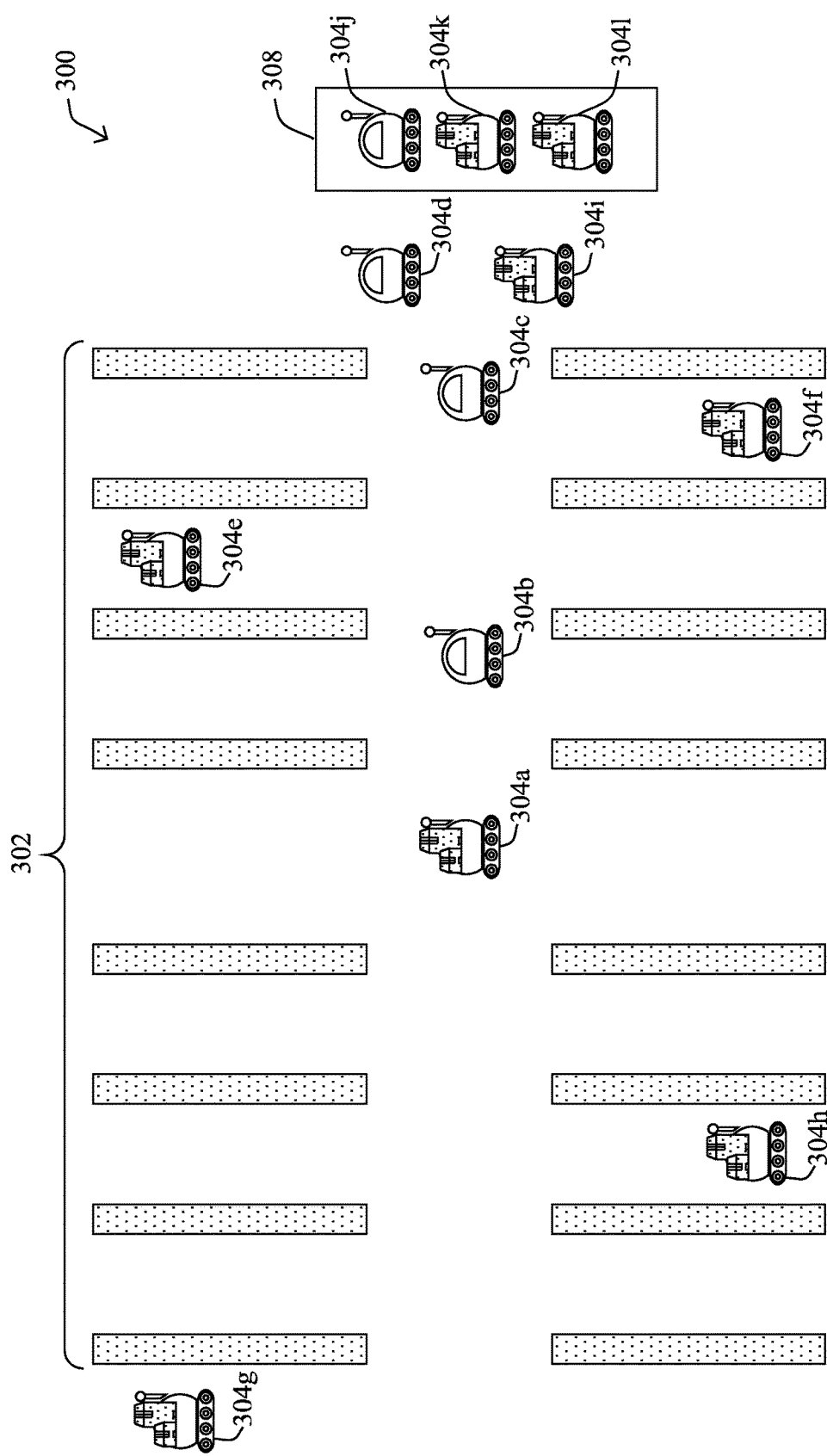
FIG. 3 illustrates an example industrial wireless network deployed in a warehouse.

FIG. 3 illustrates an example warehouse 300. As shown, assume that a plurality of inventory racks 302 are distributed throughout warehouse 300 for purposes of storing items. As would be appreciated, inventory racks 302 are optional and other forms of storage systems may be deployed throughout warehouse 300, in other cases. For instance, warehouse 300 may also include containers, holding pens, or the like, in which various items may be stored.

To aid in the storage and/or retrieval of the items in the warehouse, any number of mobile robots 304 may be deployed, such as mobile robots 302a-304l shown. In general, each mobile robot 304 may include a propulsion system that propels the robot (e.g., an engine coupled to wheels, treads, etc.), one or more sensor systems (e.g., infrared, sonar, video, etc.), a communication system (e.g., wireless, hardwired port, etc.), and a computer control system coupled to the other systems that provides supervisory control over the other systems. In some embodiments, mobile robots 304 may also include mechanisms to automatically load and/or unload items, such as forklifts, mechanical claws, or the like. In other embodiments, mobile robots 304 may require the assistance of human workers to load and unload items to and from them, such as at a pack-out area 308.

In some instances, mobile robots 304 may be partially or fully autonomous, allowing them to complete their tasks, independently. For instance, a particular mobile robot 304 may be sent a task list that indicates the set of items that the robot is to retrieve from within warehouse 300, navigation information if so needed, or any other information that may be required for the performance of its retrieval functions.

As noted above, operational technology (OT) networks have traditionally favored wired networking techniques, due to their perceived reliability over wireless approaches. Indeed, if a wireless communication is lost or delayed in an industrial setting, it could disrupt the manufacturing (or other) process that is being controlled. However, as the IoT expands into these settings, the use of wireless networking often becomes unavoidable, such as in the case of mobile devices (e.g., mobile robots 304 in FIG. 3). Current approaches, however, still need to contend with issues such as the speed of roaming supported by the network, shelving masking the wireless signals, and the like.

There are also some efforts to adapt Time Sensitive Networking (TSN) to both 5G and 802.11, to support wireless OT deployments. In both cases, the adaptation adds complexity over the already complex set of standards, making them even harder to understand and operate, and ultimately to have confidence in the solution. Confidence, in fact, is the core requirement in OT networking as it allows one to understand and make assumptions on its behavior. In 5G and 802.11, the adaptation builds on the existing peer-to-peer P2P relationship between a client/station (STA)/user equipment (UE) and an access point (AP)/base station (BS)/gNB, respectively. Note that the terminology varies by wireless protocol and the terms "client" and "AP" are used herein for purposes of simplicity, without limiting the techniques herein to a specific protocol. Regardless, these efforts still require the establishment of a wireless association between a client and AP, which can naturally slow down the roaming process, as well as preventing the use of multi-point to multi-point (MP2MP) radio connectivity.

Figure 4B:
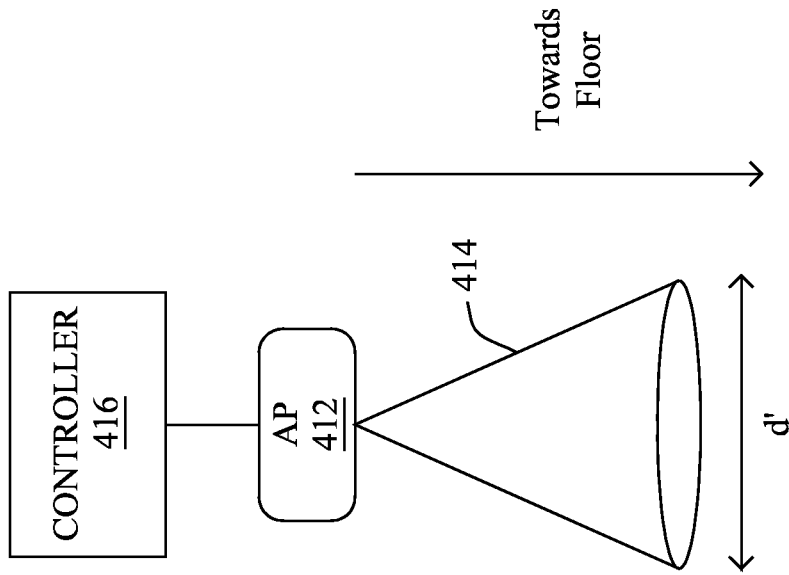
FIGS. 4A-4B illustrate example radiation patterns by nodes of a wireless network.
Figure 4A:
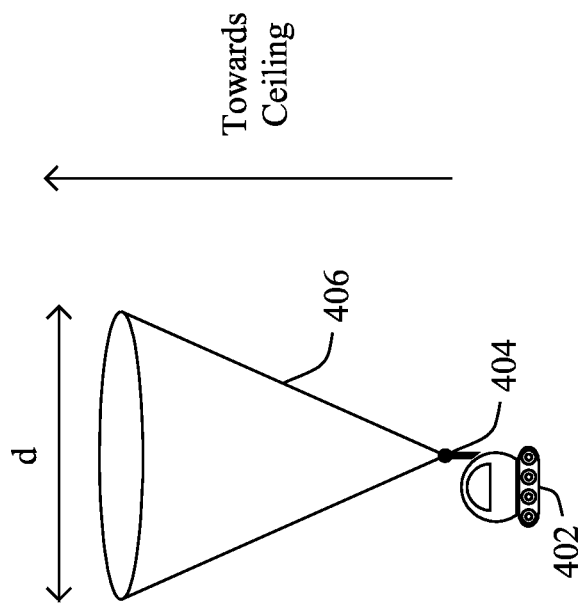

FIGS. 4A-4B illustrate example radiation patterns by nodes of a wireless network, according to various embodiments. As shown in FIG. 4A, a client device 402, such as a mobile robot 304 in FIG. 3, a stationary device, or any other wireless client requiring connectivity, may include a transceiver or transceiver that comprises a directional antenna 404 that is pointed substantially upward relative to client device 402. For instance, in the case of a warehouse, factory, or the like, directional antenna 404 may be pointed substantially towards the ceiling of the building.

In general, a defining characteristic of directional antenna 404 is that its radiation pattern will exhibit significantly higher gain in the upward direction than in its lateral directions. As would be appreciated, this can help to prevent client device 402 from interfering with any other nearby client devices, as its transmissions are directed substantially upward. Example directional antennas that may be suitable for use as directional antenna 404 may include, but are not limited to, Yagi antennas, log-periodic antennas, corner reflector antennas, phased array antennas, and the like. For instance, in the case of directional antenna 404 including multiple radiating elements, client device 402 may use beamforming to direct its transmissions substantially upward (e.g., near, or precisely, perpendicular to the floor of the area).

As a result of the operation of directional antenna 404, any wireless transmission from client device 402 will take the form of a beam cone 406 that exhibits a diameter d when it comes in contact with the overhead mesh of access points above client device 402. Note that even in the case of extremely tight beam patterns, divergence effects will cause the transmissions to exhibit an increased diameter as the distance increases, thereby taking on a cone-like pattern.

FIG. 4B illustrates an example access point of the overhead mesh of access points introduced herein, according to various embodiments. As shown, access point (AP) 412 may use a similar approach as that of client device 402 to direct its transmissions, but in the opposite direction towards the floor of the area. Thus, AP 412 may include a directional antenna that sends communications from AP 412 that may take the form of a beam cone 414 having a diameter d' at the floor of the area or at a predefined height relative to the floor.

To prevent energy leafage between cones (e.g., between the beam cones of different APs, different client devices, etc.), the energy differential may be sufficient to eliminate the parasite signal, such as by the receiving device. This is true also for a signal that will rebound multiple times and be attenuated by distance and diffusion/spreading on a reflective surface that is not flat. In other instances, the sending device (e.g., client device 402, AP 412, etc.) may also be equipped with shielding that can absorb whatever energy is not perfectly radiated in the cone, in some embodiments.

In various embodiments, AP 412 may be controlled by a controller 416 that oversees the operation of the entire set of APs in the overhead mesh or a portion thereof. In some embodiments, controller 416 may compute and provide a communication schedule to AP 412. Such a communication schedule may control when AP 412 is to transmit data towards the floor of the area and/or listen for any messages transmitted upward towards the mesh of overhead APs. In a further instance, the communication schedule sent to AP 412 by controller 416 may also dictate the wavelengths/channels on which AP 412 is to communicate.

During deployment, overhead APs, such as AP 412, may be placed along the ceiling or other overhead structure, to ensure that there is always at least one AP in the beam cone of a client device. Preferably, there will always be at least two APs within the beam cone of a client device, thereby providing redundancy in case a transmission from the client device is not received by one of them.

In some embodiments, a client device, such as client device 402, may communicate wirelessly with an AP of the overhead mesh, such as AP 412, without having to first perform an association exchange with it. As would be appreciated, such exchanges typically entail a discovery phase, an authentication phase, and a final association phase. During the discovery phase, the client device and the AP first discover one another, wirelessly. This is often achieved by the AP sending out a beacon signal, the client device sending a probe request to the AP, and the AP returning a probe response. Such a response allows the client device to determine which AP is the 'best' in terms of signal strength/received signal strength indicator (RSSI). During the authentication phase, the client device may then send an authentication request to the AP that often includes cryptographic information that allows the network to authenticate the device (e.g., a password to connect to a Wi-Fi network). Finally, once authenticated, the client device may send an association request to the AP to which the AP responds, thereby forming an association between the client device and the specific AP.

Rather than requiring an association exchange with a given AP in the traditional manner, the techniques herein propose that a client device simply register with the controller for the overhead mesh of APs. For instance, client device 402 may register with controller 416. In various embodiments, this registration may also entail client device 402 and controller 416 coordinating the movements of client device 402 over time in the area, either on a pull or push basis. In a fully or semi-autonomous mode of operation of client device 402, for instance, the registration with controller 416 may entail client device 402 or another device in communication therewith providing the movement schedules of client device 402 to controller 416. Alternatively, controller 416 itself may dictate the movement schedule of client device 402 as part of the registration process (e.g., to ensure that client device 402 is not near any other client device when transmitting, to avoid interference). In either case, controller 416 may then generate and provide a communication schedule to client device 402 that may be based in part on the movements of client device 402 over time, in some embodiments.

Since the communications of the client devices and the APs in the overhead mesh are both scheduled by controller 416, there is no need for any given client device to first perform an association exchange with any given AP in the overhead mesh. Instead, any AP in the mesh that receives a transmission from the client device may simply relay the received message onward, such as to controller 416. In the case of multiple APs receiving the same transmission from a client device, controller 416 can then perform deduplication of the redundant messages (e.g., before sending the message on towards its destination, before processing the message locally, etc.).

For instance, client device 402 may simply transmit a message without specifying a source and destination media access control (MAC) address, such as by using a broadcast mode of transmission that is received by one or more of the overhead APs in the mesh. Based on the location of the AP(s) that receive a transmission and/or the timing of the transmission, controller 416 can easily identify the sender of the transmission. In other words, the receiving AP(s) in the mesh essentially function as translational relays that do not have to process MAC addresses or any cryptography (e.g., as part of an authentication exchange).

Figure 5:
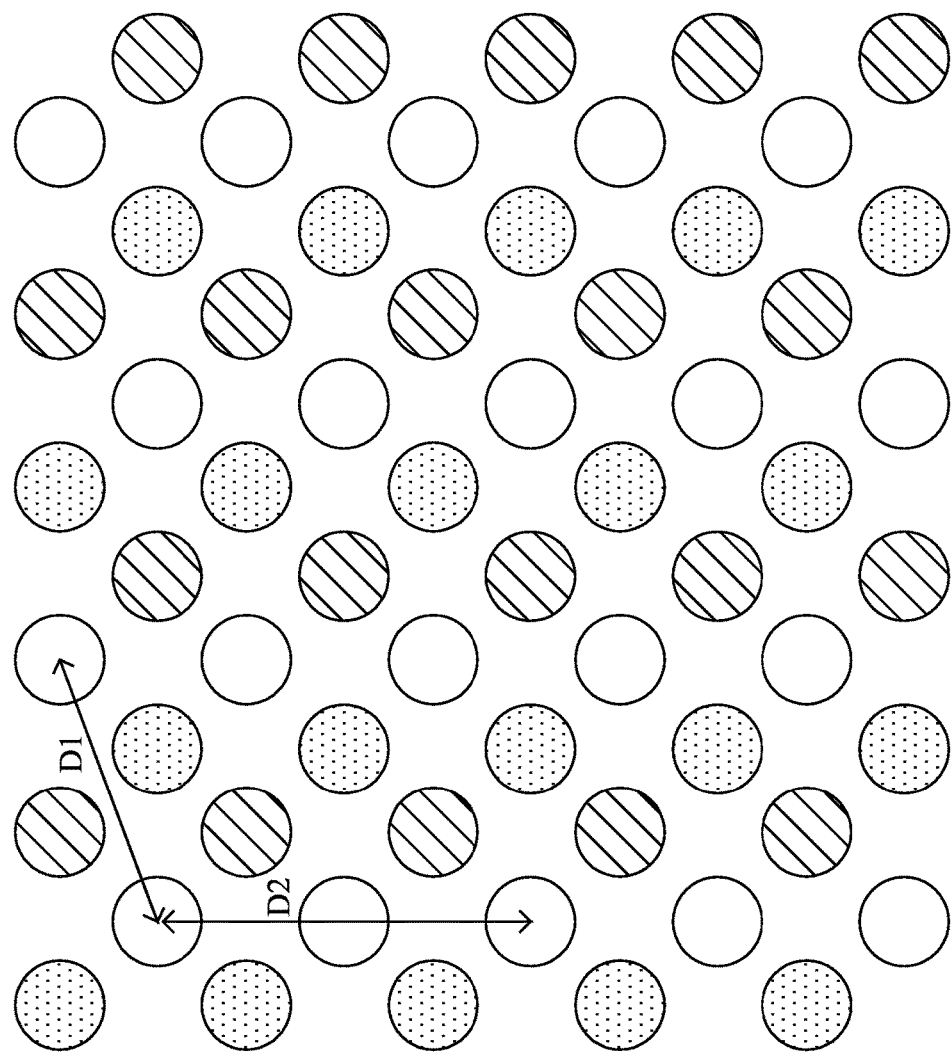
FIG. 5 illustrates an example mesh of overhead-mounted access points.
Figure 5:
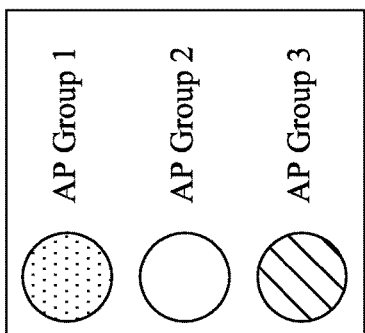

FIG. 5 illustrates an example mesh 500 of overhead-mounted access points (e.g., APs 412), according to various embodiments. In some embodiments, the controller for the mesh (e.g., controller 416) may subdivide the APs in the mesh into different groups, each of which is assigned to a different channel or channel hopping schedule. For instance, mesh 500 may be divided into three different subsets/AP groups, each of which operates on a different channel at any given time. Of course, any number of different AP groups and wireless channels could be used, as desired.

In a further embodiment, the different APs, or different radiators/antennas of a certain AP, in any given group may also be assigned to different time slices in their communication schedules, as well. For instance, assume that four of the circles shown in FIG. 5 belonging to AP group 1 are all controlled by a singular AP having four directional antennas. In such a case, the communication schedule may assign each antenna to a different time slice and the AP may rotate its transmissions across its four antennas, only transmitting on one of them at any given time.

To ensure that any given client device is able to reach at least one of its corresponding APs in mesh 500 during any transmission, the APs in any given group may be physically spaced such that at least one of them will always fall within the diameter of the beam cone of the client device (e.g., diameter d shown in FIG. 4A). In addition, since the wireless network is associationless, this means that a roaming operation does not need to be performed when the client device moves out of the range of one AP and into the range of another AP, as the APs are all functionally equivalent relays for the client device.

Further considerations for the physical layout of 500 may also take into account the communication schedules and channel groupings of the APs. For instance, let D1 represent the distance between APs in the same subset/group that belong to different time slices, meaning that they do not transmit at the same time on the same channel. In addition, let D2 represent the distance between APs of the same subset/group that belong to the same time slice, meaning that they do transmit on the same channel at the same time. In various embodiments, mesh 500 may be deployed such that the following condition is satisfied:

$$D1 < d < D2$$

where d is the diameter of the beam cone of a client device at the height of the ceiling, mesh 500, etc. and/or the diameter of the beam cone of an AP at the floor of the area, at the height of any receiver of a client device, etc. In doing so, this ensures that the client device is able to communicate with at least one AP in mesh 500 on its channel and during its assigned time slice, but not any interfering ones.

The physical sizes of the client devices and their scheduled movements may also be such that the number of client devices in any given downward cone from an AP is limited (e.g., only one client device is physically able to fit within the diameter d' of the beam cone of a given AP). In some embodiments, the communication schedules of the APs and client devices may be such that the client devices transmit at the same time and the APs transmit together, as well. The result is that the energy leaking from any client device will not affect any other nearby client device, since they are not receiving at that time. Note that, in some instances, there may be some reflection of a signal by either the ground or ceiling. However, the client device may act as a shield against such reflections in the downward case. In addition, any reflections will be further attenuated by distance, coating, irregularities on the surface that make the inference dependent on the location, or the like. Movement of a client device can also help to eliminate this issue. Regardless, any unwanted signals due to reflection can be eliminated (e.g., by the receiving device) by filtering the received transmissions by their power level diversity.

While the above techniques are described primarily with respect to radio frequency (RF) transmissions, a variation of the techniques herein would be to leverage Li-Fi for at least a portion of the wireless transmissions. As would be appreciated, Li-Fi is another wireless communication approach that uses visible light, ultraviolet, and/or infrared light to convey messages, wirelessly. This option may be preferable to using RF in instances such as warehouses with tight corridors that limit the window of a client device to the overhead mesh. In addition, using Li-Fi can also avoid having to filter transmissions that result from RF echoing off metallic structures.

Thus, in some embodiments, the APs of mesh 500 may take the form of Li-Fi transmitters or transceivers that use light emitters, rather than directional RF antennas, to send data to the client devices. Similar to the RF case above, the APs may also be subdivided and assigned to groups that communicate using different wavelengths (e.g., light-based 'channels). In some embodiments, the client devices may also be equipped with tracking systems that identify the source of a Li-Fi transmission so that it can direct its own transmissions upward towards that AP.

In further embodiments, both Li-Fi and RF can be used in concert with one another, providing additional redundancy to ensure communication at all times. In this case, different modes of operation are then possible, in various embodiments:

Both Li-Fi and RF are used at all times.

The APs of mesh 500 use Li-Fi or RF in an alternating fashion, according to some communication schedule (e.g., similar to a chess board configuration, etc.).

The APs of mesh 500 use Li-Fi by default and resort to using RF in the case of failures, only.

In all of the above cases, the combination of RF and Li-Fi allows also for full-duplex communications between a client device and an AP. For instance, light may be used for the downlinks from an AP to a client device and radio may be used for the uplink from the client device to the AP at the same time, without interfering with one another.

As a result of the above techniques, multiple APs may receive and relay the same frame transmitted by a client device. To provide such global coverage of the area without creating interference conditions, the transmitters/antennas of the APs may be physically spread out in an interleaved pattern across APs that operate on different channels, according to a time-sliced communication scheduling mechanism. Such scheduling may cause the APs to rotate among their transmitters on the same channel (e.g., those of APs belonging to the same AP group) such that any two of them are distant enough so as to not interfere with one another at the same time. This increases the density of the antennas and allows for global coverage for each wireless channel.

Figure 6:
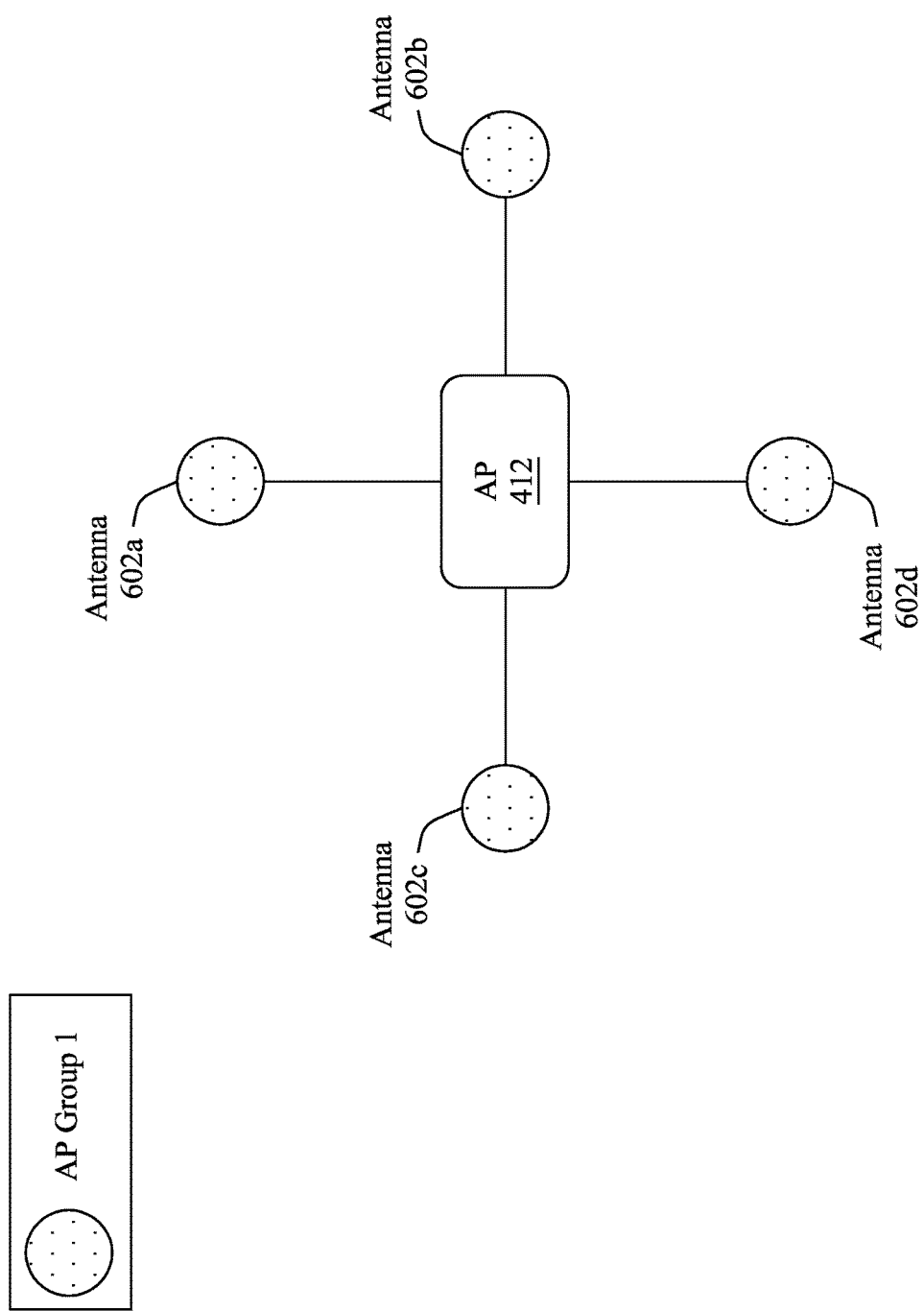
FIG. 6 illustrates an example access point having multiple antennas.

FIG. 6 illustrates an example AP 412 having multiple antennas, according to various embodiments. For instance, as shown, AP 412 may include antennas 602a-602d, each of which may transmit beam cones in a direction substantially downward from the mesh of APs towards the floor of the area. While AP 412 is shown to have antennas 602a-602d in a cross-like orientation, further embodiments provide for AP 412 to include fewer, or more, antennas in other physical layouts (e.g., a hexagon, etc.), so long as the resulting shapes can connect with one another in the mesh to form a global and homogeneous coverage of the area. In other words, the shape can be filled with any density of antennas for MIMO, MU-MIMO, or massive MU-MIMO operations.

As shown, the mesh controller may assign AP 412 to a particular AP group 1, members of which are on the same channel at any given time. According to various embodiments, the communication schedule for AP 412 may be such that only one of its antennas 602a-602d is allowed to transmit during any given time slice. For instance, the communication schedule for AP 412 may dictate that it can transmit using antennas 602a-602d in a rotating manner over time, such as by allowing antenna 602a to transmit first, followed by antenna 602b, followed by antenna 602c, followed by antenna 602d, followed by antenna 602a again, etc.

In contrast to many existing APs that use multiple antennas for multiple-input, multiple-output (MIMO) operation, the primary purpose of AP 412 having multiple antennas 602a-602d is to provide spatial diversity. In the system herein, both APs and client devices may receive at all times from any antenna. However, APs are constrained as to which of its antennas are allowed to transmit at any point in time (i.e., the antenna permitted to transmit is tied to a time slice in the communication schedule). In addition to this, APs and client devices may be scheduled to transmit at alternating times, in some embodiments. In this case, AP 412 should use its antenna that is above the client device and thus wait for the slice that corresponds to the antenna. If the AP is not aware of the movement of the client device, but its controller is, then the controller needs to time precisely when its sends the packet to the client device via an AP at the time the client device is below the active antenna of that AP.

Even with shaped transmissions, there can be some co-channel interference from other transmitter due to energy that leaks from the edge of other channels and beams that are reflected on metallic surface. This represents only a limited amount of energy but that still may cause trouble for the reception of packets.

——Coordinating Best Effort Traffic to an Associationless, Overhead Mesh of APs——

The techniques introduced herein allows an overhead mesh of APs to poll both deterministic and best effort traffic from clients in an associationless manner. More specifically, since the communications are associationless, a given AP in the mesh does not know whether any specific client is located in its downward facing receive beam. In some aspects, the AP may poll ranges of client identifiers (e.g., MAC addresses, IP addresses, etc.). In turn, a client device falling within that range may (pseudo-)randomly pick resource units (RUs) at the trigger time at which it is polled. In further aspects, the range of identifiers may also be divided when collisions are observed, to spread the transmitting clients in the time domain (e.g., leveraging a Newtonian dichotomy to split a range). Note that such a division can also allow overlaps, in some instances. Further aspects of the techniques herein also provide for the remerging of the contiguous pair, when there is no traffic in one of the pair.

Illustratively, the techniques described herein may be performed by hardware, software, and/or firmware, such as in accordance with communication process 248, which may include computer executable instructions executed by the processor 220 (or independent processor of interfaces 210) to perform functions relating to the techniques described herein.

Specifically, in various embodiments, an access point of an overhead mesh of access points in an area selects a range of client identifiers. The access point sends, via a beam cone transmitted in a substantially downward direction towards a floor of the area, a trigger signal that includes the range of client identifiers and prompts client devices having identifiers in that range to send best effort transmissions towards the overhead mesh. The access point detects a collision between the best effort transmissions of the client devices. The access point adjusts the range of client identifiers so as to avoid future collisions between the best effort transmissions of the client devices.

Operationally, the techniques herein support the autonomous computation of communication schedules by an AP of an overhead mesh, based on the profile of the deterministic needs of a client device. Such needs may be determined by the controller of the overhead mesh on detection of the client device bin the downward pointing beam cone of the AP. The controller may also provide additional metadata for the transmission, including the current and predicted best antennas to use to communicate with the client device, based on known or predicted movement schedules of the client device.

In various embodiments, client devices (e.g., robots, etc.) may be treated as Internet 0/OCB working group bridges (WGBs) that obey triggers from APs in the overhead mesh to transmit and receive. In other words, the communication schedules between the overhead mesh and a client device may be controlled by the ceiling, with the client device receiving and sending at the times dictated by the mesh. In some embodiments, one or more APs of the overhead mesh learn the IP address and the best antenna for each client device from continuous uplink traffic. The determination of the best AP/best antenna overall for downstream traffic (i.e., from the mesh to the client device) may be made by the controller for the mesh.

FIGS. 7A-7F illustrate an example 700 of ceiling-controlled communication scheduling in an overhead mesh of access points, according to various embodiments. Continuing the previous examples, consider again the case of a client device 402 having a directional antenna 404 pointed substantially upward such that it sends a beam cone 406 towards APs of an overhead mesh, such as any of APs 412a-412c shown. Overseeing the operations of APs 412a-412c may be controller 416, described previously.

Discovery of the presence of client device 402 by the mesh may be achieved in a number of ways, in various embodiments. In some embodiments, any or all of APs 412a-412c may beacon out a null data packet. In response to such a beacon, client device 402 may answer, thereby announcing its presence. To do so, in one embodiment, client device 402 may send its answer while in a specific, time-slotted synchronization zone in the area. This way, the AP 412 that is overhead client device 402 at the time will detect not only the presence of client device 402, but also signal quality information regarding the quality of reception, such as received signal strength indicator (RSSI) information or the like.

Based on the discovery of the presence of client device 402 and the signal information, the AP(s) 412 may then inform controller 416 as to the detection of client device 402 in the area. For instance, assume that AP 412a receives an answer to a discovery beacon from client device 402. In such a case, it may send an indication 702 to controller 416, to notify controller 416 as to the discovered presence of client device 402. In further embodiments, indication 702 may also include additional information garnered by AP 412a about client device 402, such as its IP address, signal information (RSSI, etc.), etc. In turn, controller 416 may then store the received information in a register, which may either be local to controller 416 or in communication therewith.

As shown in FIG. 7B, controller 416 may select a set of APs 412 in the overhead mesh to service client device 402, in various embodiments. To do so, controller 416 may take into account any or all of the following factors:

The deterministic traffic needs of the discovered client device 402. For instance, controller 416 may have information that client device 402 will need to send and receive one frame every 5 ms to implement a control loop that automates the navigation of client device 402 throughout the area and guarantee the safety of the passengers.

The current location and future movements of client device 402 within the area, so as to select the best APs and/or antennas to support communications with client device 402.

Controller 416 may determine the location of client device 402 and its future movements using a variety of approaches, in various embodiments. The current location of client device 402 may be determined, for instance, through triangulation. In some embodiments, the unique layout of APs 412 and their antennas (e.g., as shown in FIG. 6) allows for both simplified triangulation of the location of client device 402, as well as more precise localization of client device 402. More specifically, since the antennas of an AP 412 are displaced at predefined distances from that AP, the AP could triangulate the location of a client device based on the time difference of arrivals (TDOAs) of signals from that client device. This alleviates the need for multiple APs to coordinate with one another (e.g., in a distributed manner or a centralized manner using controller 416), to determine the location of a client device. Of course, the location of a client device could be detected with even greater precision through such coordination, such as by determining the overlap of estimated locations from different APs 412.

Two possibilities exist with respect to the future movements of client device 402 within the area. In a simple embodiment, the movements of client device 402 within the area may be predefined, as in the case in which client device 402 is not autonomous or only semi-autonomous (e.g., only autonomous to avoid collisions). This may be the case in locations such as factories, warehouses, etc., in which a robot has to perform scheduled tasks at different locations. In such a case, controller 416 may receive a schedule of movements for client device 402 within the area, such as from a supervisory service overseeing the control of client device 402.

In other embodiments, controller 416 may predict the movements of client device 402 within the area, if its prescheduled movements are not already available. This may be the case such as when client device 402 is fully autonomous, operated by a human (e.g., a forklift), or the like. Controller 416 may do so by assessing the current location of client device 402 in the area (e.g., as determined by one or more APs 412), estimating its velocity, direction, etc., and assigning probabilities to different potential outcomes (e.g., movement in a certain direction, movement in another direction, no movement, etc.).

Based on the above factors, and potentially also taking into account the communication schedules to support other client devices, controller 416 may select a set of APs 412 to support communications with client device 402. For instance, in the simplified case of FIG. 7B, controller 416 may select APs 412a-412c to support communications with client device 402. Indeed, controller 416 may select APs 412a-412c to optimize the signal quality for client device 402 during its movements, while balancing the load over the APs 412 of the overhead mesh, and still supporting the deterministic traffic (uplink and downlink) needs of client device 402. By optimizing the signal quality, controller 416 may select APs 412 to service client device 402 such that it has at least one AP 412 that can service it with acceptable signal quality and enough bandwidth for its deterministic needs, and the remainder of bandwidth dedicated for deterministic traffic allowing it to use alternate APs for retries.

Figure 7A:
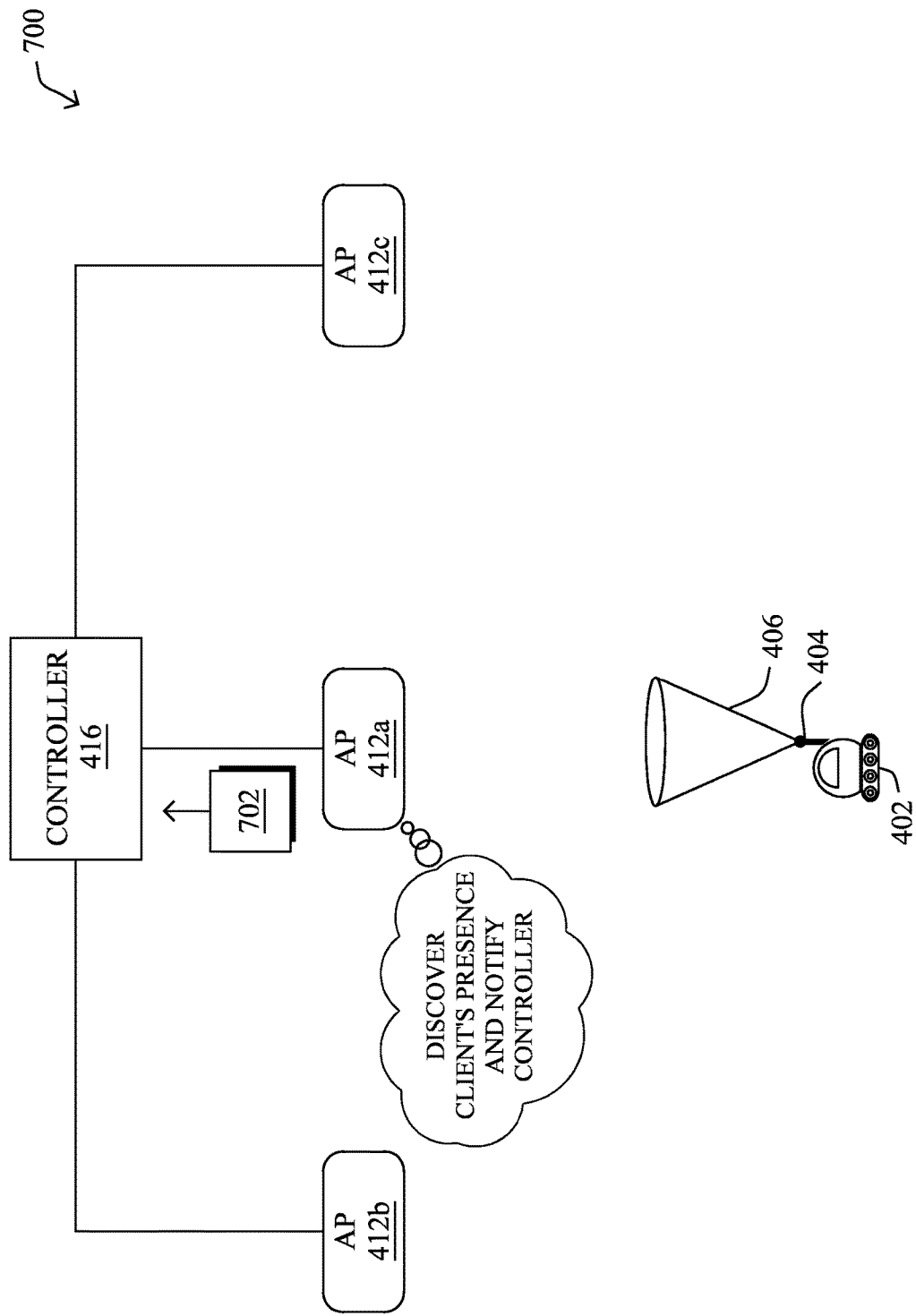
Figure 7C:
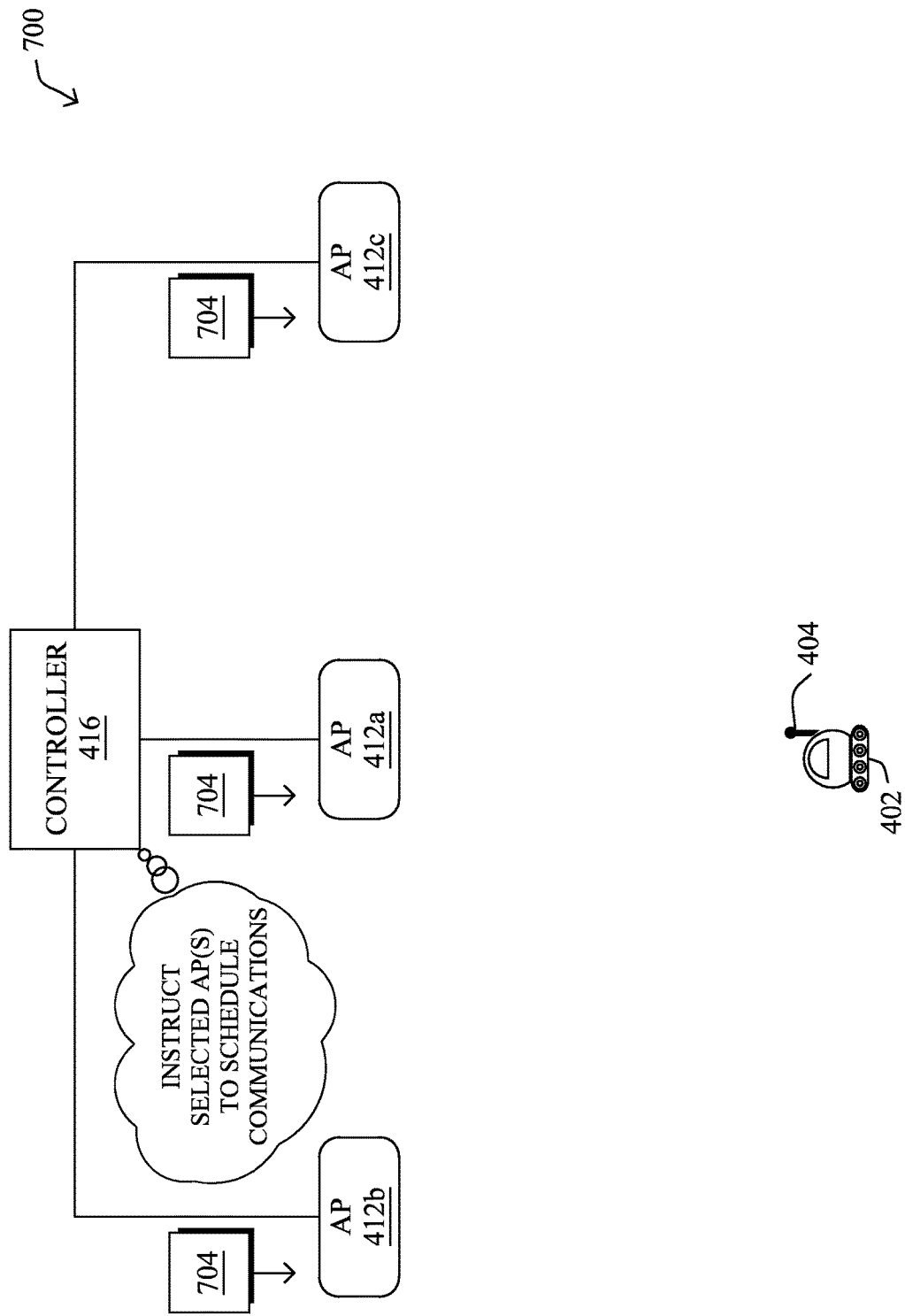

As shown in FIG. 7C, controller 416 may send instructions 704 to the selected APs 412 to support communications with client device 402. In various embodiments, instructions 704 may also include any information that it has garnered about client device 402, such as its movements, IP address, bandwidth requirements, etc. In turn, each of the selected APs 412a-412c may build a communication schedule that ensures the transmission opportunities for the client device 402, and any other client device(s), that it servers.

A key aspect of the techniques herein is that client device 402 is able to communicate with the overhead mesh in an associationless manner. That is, client device 402 does not have to perform an association exchange with any given AP 412 before sending traffic to it or receiving traffic from it. To this end, an AP 412 selected by controller 416 to support communications with client device 402 may utilize a pull mechanism to initiate uplinks from client device 402 to the overhead mesh.

Figure 7D:
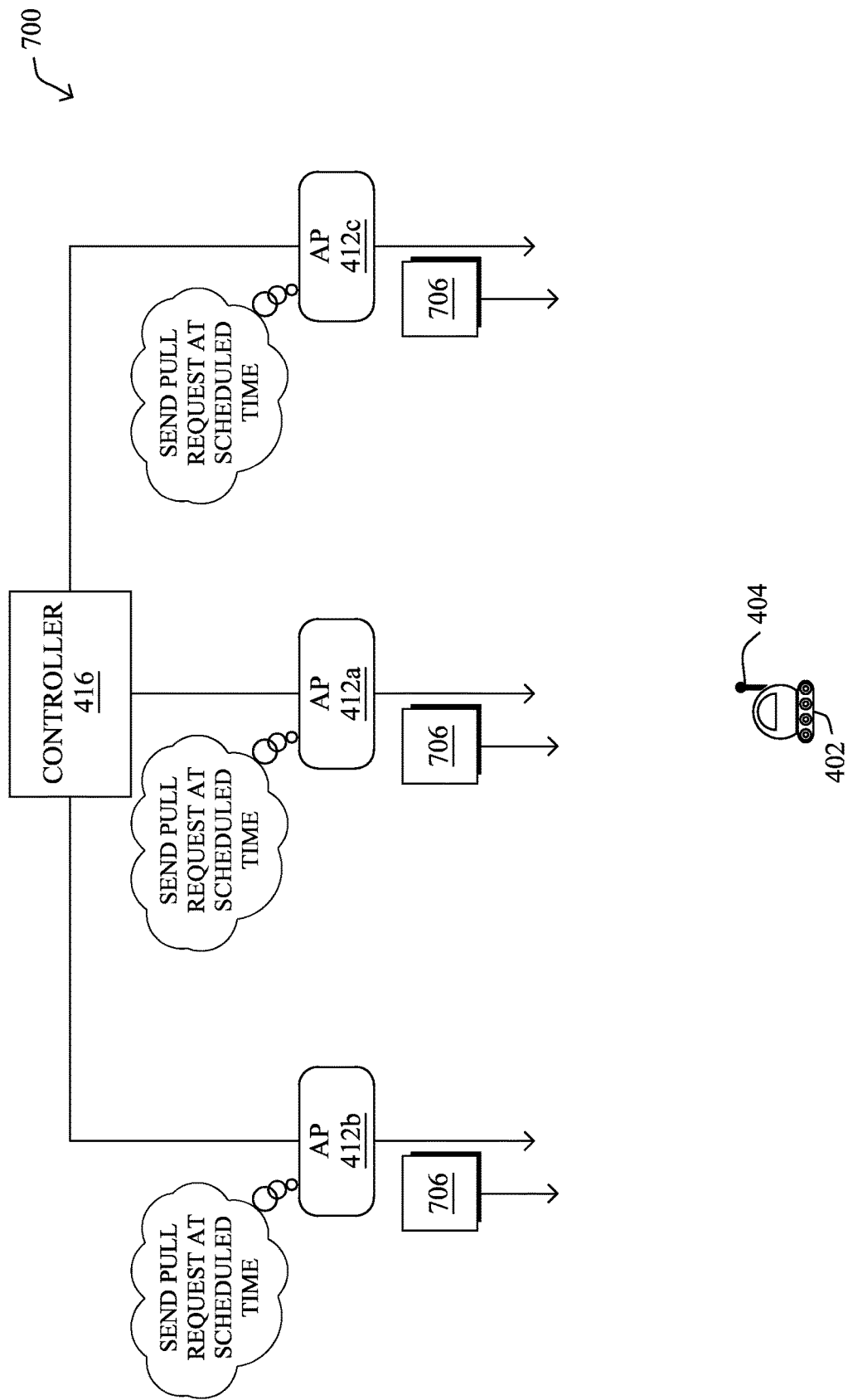

As shown in FIG. 7D, on reaching a scheduled reception time according to its communication schedule, any or all of the selected APs 412a-412c may send out a pull request 706. Such a pull request 706 may take the form of a trigger signal, such as in Wi-Fi 6, to pull traffic from client device 402 by prompting it to transmit traffic upwards towards the overhead mesh. In Internet 0 mode, there is no association and no need for differentiating MAC addresses. Instead, pull request 706 may imply indicate which client device 402 from which a transmission is requested. For instance, pull request 706 may simply indicate the IP address of client device 402, indicating that client device 402 should begin transmitting any data that it needs to send to the overhead mesh.

In one embodiment, for compatibility with 802.11 implementations, the IP address being pulled in Internet 0 mode can be embedded in the 802.11 L2 address using an 0x3333 prefix, and then full IPv4 or the last 4 octets, or the IPv6 address, as done to generate the L2 multicast address used by the IPv6 Neighbor Discovery Protocol for the IPv6 solicited-node multicast address.

As shown in FIG. 7E, in response to receiving a pull request 706, client device 402 may place its packet in the indicated resource unit (e.g., time and subchannel slot) and transmits it upward towards the overhead mesh as traffic 708. A receiving AP 412, such as AP 412a, then forwards the received traffic 708 on to controller 416 for further processing. In some instances, the receiving AP 412 may also forward the packets of traffic 708 on to controller 416 using a cut through mechanism, as opposed to a store-and-forward approach, and/or time sensitive networking (TSN) preemption over the wire, to pass the packets faster to controller 416.

Note that client device 402 remains unaware of the specific AP 412 with which it is communicating and does not need to know, as the communications are associationless. In one embodiment, traffic 708 may also include sequence information that can be used by controller 416 to remove duplicate packets, such as when traffic 708 is received by multiple APs 412 and forwarded to controller 416.

In some embodiments, an AP 412 may also initiate a retry pull request 706 one om more times, such as when it does not receive any traffic 708 from client device 402 in response to a pull request 706. For instance, in one embodiment, an AP 412 may do so when traffic 708 is expected and/or critical (e.g., as part of a navigation control loop with client device 402). Again, client device 402 may not realize nor care whether it is the same AP 412 or a different one issuing the retry pull request 706. This retry management may also be controlled by the AP 412 based on the scheduled expectation of deterministic traffic obtained from controller 416 and/or an indication from controller 416 that another AP 412 was able to successfully pull traffic 708 from client device 402 or not.

Figure 7F:
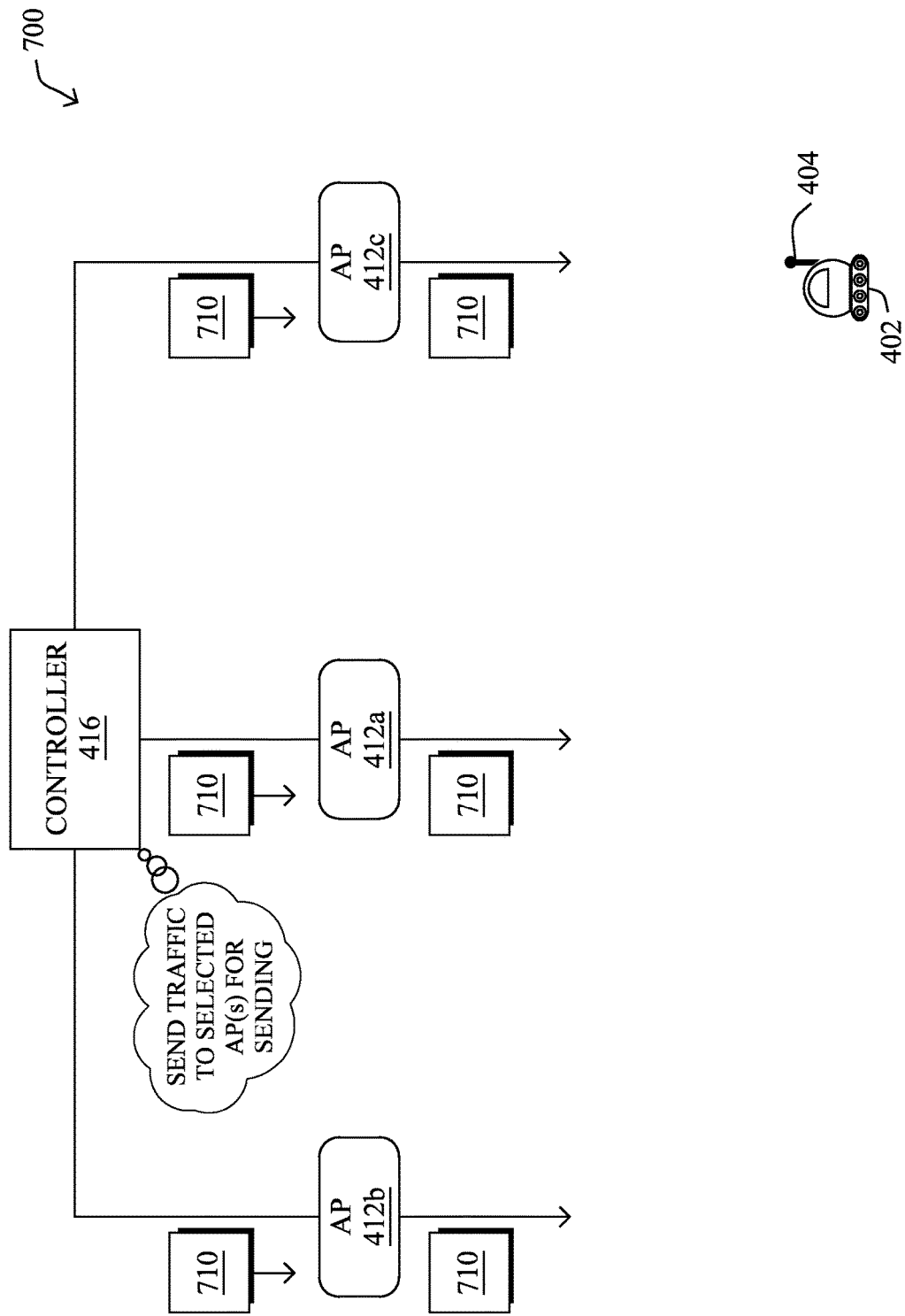

Downlink operations (i.e., traffic being sent from the overhead mesh to client device 402) may also be performed in accordance with the communication schedules of APs 412. For instance, as shown in FIG. 7F, controller 416 may send traffic 710 destined for client device 402 to the selected set of APs 412a-412c for client device 402. In turn, APs 412a-412c may queue traffic 710 until a scheduled transmission time slot for client client device 402 is reached. When this occurs, APs 412a-412c may send traffic 710 downward towards the floor, for reception by client device 402. The MAC operation also does not necessarily involve an acknowledgement by client device 402. In addition, an AP 412 may schedule more than one transmission slot for redundancy. For instance, this can be done based on information from controller 416 that other APs 412 may also send, an indication as to whether traffic 710 is critical or not, etc.

Another aspect of the techniques herein relates to the rotation of security keys, which may be done on a network-wide basis. In some embodiments, the use of security keys in the wireless network may be similar to that of LoRaWAN, whereby a network key and application key secure communications from client device 402 to the network server and from client device 402 to the application server. These keys may be established when client device 402 first joins the network, with rekeying only happening during a re-provisioning step. In 802.11, however, a temporal exchange may be made between client device 402 and an AP 412 with rotation, to ensure long-term communication security.

Here, client device 402 may onboard with controller 416 to establish a set of base credentials and derived keying information, in some embodiments. In turn, metadata may be piggybacked on exchanged frames between client device 402 and the overhead mesh of APs 412, to identify a keying epoch and the need to rekey. Alternatively, or in addition thereto, the rekeying overhead may be factored into the required slot of a super frame. Either way, APs 412 may simply act as relays of information to and from controller 416, making the rekeying negotiation only loosely executed over a set of APs/antennas and coverages over time to a new set of keys that can trigger a new keying epoch.

As would be appreciated, one observation regarding client device 402 is that it may have two different types of traffic to send to the overhead mesh:

1. Deterministic traffic—for instance, such traffic may be used as part of a control loop to remotely control the operations of client device 402, such as its navigation.
2. Best effort traffic—here, client device 402 may also have other traffic to send to the overhead mesh, such as diagnostics, alerts, other messages (e.g., a number of successful shots in a shoot-them-up game), or the like. A key distinction between this type of traffic and the deterministic traffic is that the precise timing as to when the best effort traffic is sent by client device 402 likely will not affect its operations, in most cases.

While the above techniques could be used to schedule uplink transmissions from client device 402 to the overhead mesh could be used to support both its deterministic and best effort needs, a key observation is that doing so is less than optimal in terms of efficiency and requires precise localization of the client devices 402. Indeed, such a setup would require a client device 402 to be at known locations at all times and specific channels and timeslots of those corresponding APs 412 dedicated to receiving uplink transmissions from that client device 402.

However, the best effort traffic of client device 402 may be sporadic in nature and sent asynchronously. In other words, APs 412 do not have any a priori knowledge as to the amount of best effort/asynchronous traffic to be sent by client device 402 at any given time. This means that a given AP 412 does not know which best effort client devices 402 are present in its receive beam at any given time, nor their needs in terms of their best effort traffic, and cannot simply poll a specific one of them for its uplink traffic without wasting significant time and resources.

Referring again to FIG. 7D, according to various embodiments, the techniques herein further propose using a pull mechanism for best effort uplink traffic to the overhead mesh that entails polling a range of client devices 402 via a single trigger signal/pull request 706. Doing so alleviates the need for a given AP 412 to send an uplink trigger to each potential client device 402 underneath it.

More specifically, an AP 412 in the overhead mesh (e.g., any or all of APs 412a-412c) may select a range of client identifiers for various client devices 402 in the area that have previously registered with controller 416. Note that an AP 412 does not need to perform an association exchange with any particular client device 402, but may still have knowledge of the set, or subset, of client devices 402 in the area. Accordingly, in some embodiments, the AP 412 may receive a set or subset of the client identifiers for those client devices 402 and select a range of them to be polled for best effort uplink traffic as a group. In further embodiments, the selection by the AP 412 may also be controlled by 416 entirely, meaning that controller 416 may instruct the AP 412 to select specific sets of client identifiers to be polled together.

The client identifiers to be used by the overhead mesh can take any number of suitable forms. In some embodiments, the client identifiers may simply be the MAC and/or IP addresses of the client devices 402. In other embodiments, the client identifiers may take the form of unique identifiers set or conveyed during registration of a client device 402 with controller 416. In yet other embodiments, the client identifiers may take the form of hash values of such addresses or unique identifiers.

Regardless of the form of client identifier used, an AP 412 may include the selected range of client identifiers in a particular trigger/pull request 706. In turn, a receiving client device 402 may compare its own client identifier to the range of sent client identifiers, to determine whether it falls within the range. For instance, on receipt of a pull request 706 that includes a range of client identifiers within which its own client identifier falls, the pull request 706 may prompt client device 402 to send its best effort traffic 708 upward towards the mesh of APs 412, as shown in FIG. 7E.

Since multiple client devices 402 are indicated in a single trigger signal/pull request 706, this could lead to collisions between their uplink transmissions. To help alleviate collisions, in some embodiments, each client device 402 having a client identifier that matches the indicated range may randomly (e.g., pseudo-randomly) a resource unit (RU) in which to send its best effort traffic upwards towards the overhead mesh. Such RUs may be akin to timeslots in 6TiSCH or resource blocks in 5G.

Figure 8:
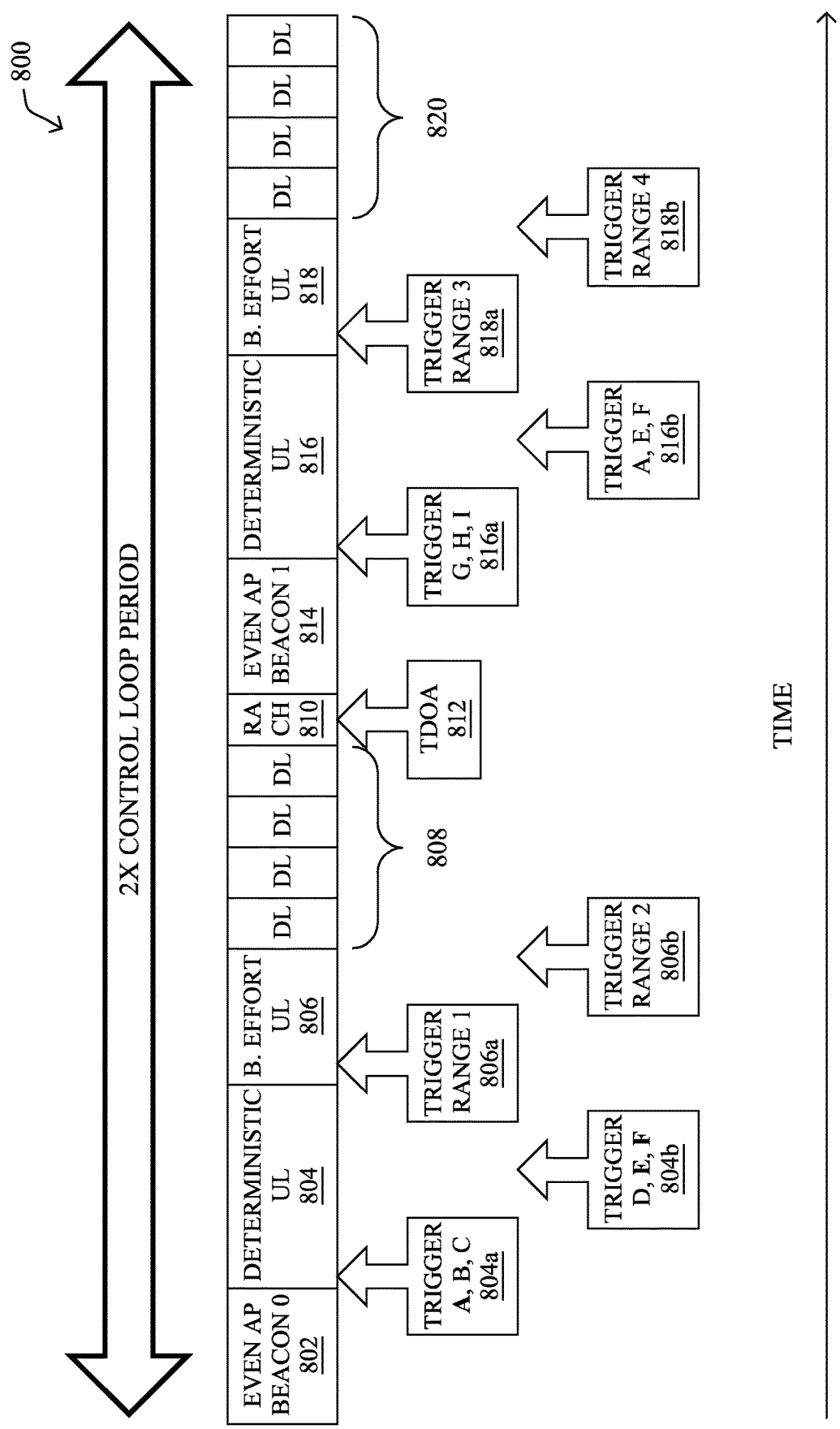
FIG. 8 illustrates an example superframe supporting best effort uplink traffic.

By way of example of the polling mechanism for best effort uplink traffic introduced herein, FIG. 8 illustrates an example superframe 800 supporting best effort uplink traffic, according to various embodiments. Superframe 800 may be used by an AP 412 of the overhead mesh to support the various uplink and downlink operations of the mesh over time. Approximately two control loop periods are shown, to illustrate the polling mechanism in greater detail.

As noted previously, during a client discovery phase, the AP 412 may send out a beacon during time 802. This beaconing may be divided among the APs 412 of the overhead mesh, depending on how the APs are grouped. For instance, the AP 412 leveraging superframe 800 may be part of an 'even' group of APs that send out beacons during time 802, while other APs 412 of the overhead mesh may belong to an 'odd' group of APs that send out beacons at other times and/or on other channels.

During time 804, the AP 412 may support deterministic uplink (UL) traffic by sending out triggers to specific client devices 402. For instance, the AP 412 may first trigger clients A, B, and C to send their deterministic traffic upwards towards the overhead mesh, starting at time 804a, followed by triggering clients D, E, and F, starting at time 804b.

In various embodiments, during time 806, the AP 412 may also trigger any present client devices 402 to send their best effort traffic upward towards the overhead mesh. Here, the triggers/pull requests may include ranges of client identifiers, prompting any receiving client having an identifier in that range to transmit its best effort traffic upward towards the overhead mesh. For instance, at time 806a, the AP 412 may send out a trigger for a first range of client identifiers and send out a second trigger for a second range of identifiers at time 806b.

Once the deterministic and best effort uplink operations have been completed, the AP 412 may then communicate downlink traffic to the various client devices 402 during times 808.

In some embodiments, superframe 800 may also include a time 810 for use by the client devices 402 via a random access channel. This can be used by the client devices 402, for instance, to identify themselves to the overhead mesh, such as in response to the beacon sent during time 802. In addition, in some embodiments, the AP 412 may use TDOA at time 812 to estimate the locations of the responding client devices 402.

Once the AP 412 has completed its beaconing, deterministic and best effort uplink, and downlink operations, it may repeat these operations. Thus, it may send out another beacon during time 814, to again announce its presence to any nearby client devices 402.

In some instances, the AP 412 may poll/trigger different combinations of client devices 402 during its second cycle of operations, according to superframe 800. For instance, during the deterministic uplink time 816, it may trigger the individual client devices G, H, and I at 816a to send their deterministic traffic upwards and then trigger the individual client devices A, E, and F to send their deterministic traffic upwards, starting at time 816b. Similarly, during the best effort uplink time 818 in superframe 800, the AP 412 may trigger a third range of client devices to send their best effort traffic at time 818a and a fourth range of client devices to send their best effort traffic at time 818b.

This process then continues, with the AP 412 sending downlink transmissions during times 820, etc.

According to various embodiments, the AP 412, and potentially in conjunction with controller 416, may make adjustments over time to the range(s) of client identifiers polled for best effort traffic in a given trigger/pull request. This can be done as follows:

By merging ranges of client identifiers into a single range: In some embodiments, if the AP 412 does not receive any response to the trigger signals/poll request for contiguous sets of client identifiers, it may opt to merge the ranges for a subsequent trigger signal/pull request.

By dividing a range of client identifiers into two or more sub-ranges: In further embodiments, if the AP 412 detects collisions between client devices having identifiers within the current range, it may decide to split that range, to avoid further collisions (e.g., according to a Newtonian dichotomy). In one embodiment, the AP 412 may detect such collisions by taking into account the number of receptions of best effort traffic, by comparing the transmission energy that it receives to a threshold value, combinations thereof, or the like. By splitting the range and dividing the load across more RUs, further collisions can be avoided. Note that the divided sub-ranges can also partially overlap, in some instances, and do not need to be completely separate.

In further embodiments, the AP 412 may employ both of the above adjustments in conjunction with one another. For instance, if the AP divides a range into sub-ranges due to detected collisions, it may attempt to remerge the client identifiers in those sub-ranges at a later time, such as when it receives little to no responses for them, separately.

In addition, a high amount of received traffic may indicate that the correct number of client devices 402 are being polled as part of the same range. However, there is still the possibility that there is more traffic being queued by these clients. Accordingly, in some embodiments, the AP 412 may also adjust when it next polls that set of client devices 402 to poll them sooner, in case there is more traffic waiting to be sent.

In summary, the uplink operation for best effort traffic to the overhead mesh may proceed as follows:

AP 412 sends a clear to send (CTS) trigger downward with a range of identifiers for acceptable transmitters (e.g., SNMA) and RUs ranges.

The indicated client device(s) 402 select RUs in which to send their best effort traffic, such as based on a hash of flow ID and time, etc., and potentially in a randomized manner.

If there is a collision in one RU, the AP 412 will fail to receive the traffic, but can still detect a collision based on the high amount of transmit energy.

In various embodiments, if too many collisions/failures are experienced, a time-based exponential back off, as in Wi-Fi distributed coordination function (DCF). Instead, the range of client identifiers can be reduced, such as by reducing the range exponentially (e.g., with a Newtonian dichotomy of overused ranges).

Client devices 402 may place request to send (RTS) in RUs with a frame sequence range (e.g., 5, 6, 7).

As would be appreciated, while a ceiling-based approach would be more efficient, further embodiments also provide for the techniques herein to be applied to a mesh of access points that are floor-based or wall-based. For instance, the access points could be placed under a false floor along alleyways, as opposed to on the ceiling, and utilize the same techniques herein to pull best effort traffic from client devices.

Figure 9:
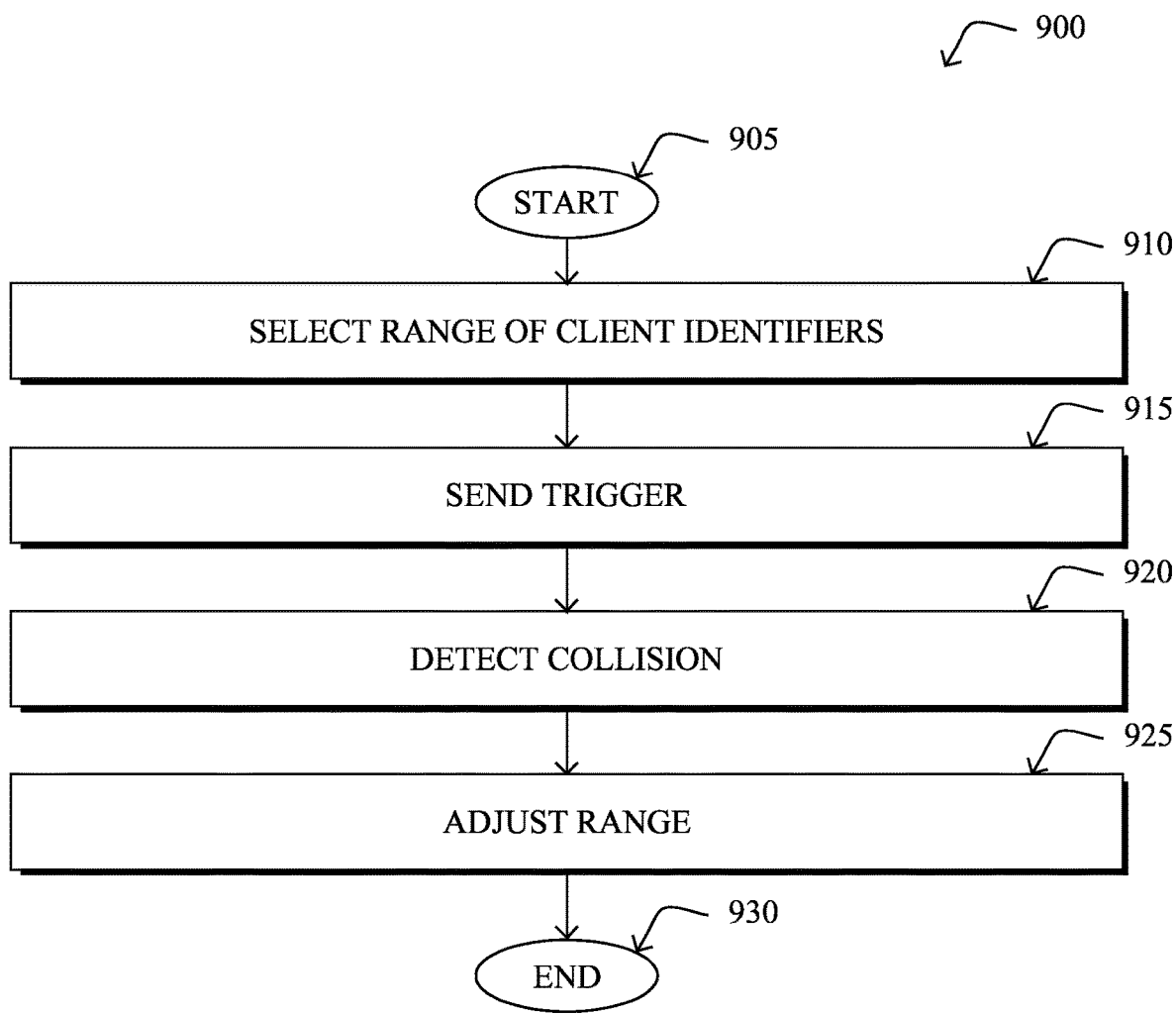
FIG. 9 illustrates an example simplified procedure for coordinating best effort traffic to an associationless, overhead mesh of access points.

FIG. 9 illustrates an example simplified procedure for coordinating best effort traffic to an associationless, overhead mesh of access points, in accordance with one or more embodiments described herein. The procedure 900 may start at step 905, and continues to step 910, where, as described in greater detail above, an access point, or other specially-configured device, (e.g., a device 200) for an overhead mesh of access points may select a range of client identifiers. In some embodiments, the range of client identifiers comprises media access control (MAC) addresses or Internet Protocol (IP) addresses. In other embodiments, the range of client identifiers comprises hash values (e.g., of MAC addresses, IP addresses, etc.). In one embodiment, the client devices comprise mobile robots.

At step 915, as detailed above, the access point may send, via a beam cone transmitted in a substantially downward direction towards a floor of the area, a trigger signal that includes the range of client identifiers and prompts client devices having identifiers in that range to send best effort transmissions towards the overhead mesh. In various embodiments, the client devices that send the best effort transmissions randomly select resource units in which to send their best effort transmissions towards the overhead mesh. In some embodiments, the access point may also send a second trigger to a particular one of the client devices at a scheduled time that prompts the particular one of the client devices to send deterministic traffic towards the overhead mesh. In other words, the access point may support deterministic uplink traffic at scheduled times for a specific client device, as well as best effort uplink traffic for a range of client devices at other times.

At step 920, the access point may detect a collision between the best effort transmissions of the client devices, as described in greater detail above. In one embodiment, the access point may do so by detecting a threshold amount of transmitted energy in the area at a particular time.

At step 925, as detailed above, the access point may adjust the range of client identifiers so as to avoid future collisions between the best effort transmissions of the client devices. In some embodiments, the access point may do so by dividing the range of client identifiers into two or more sub-ranges to be used in separate trigger signals. In one embodiment, the two or more sub-ranges partially overlap. In yet another embodiment, contiguous ranges of client identifiers may also be merged to be included in a single trigger signal, based on a determination that no responses were received in response to trigger signals for those contiguous ranges of client identifiers. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Therefore, the techniques herein introduce wireless communication approaches that avoid the need of a client device to associate with an access point, so that it can simply transmit to any access point in its range at any given time. In further aspects, the techniques herein also ensure that all the channels can be used in all locations so that a client device can transmit on any channel without failure. The techniques herein also ensure that only one access point is able to transmit to a given location at any given time, so that there is no interference from other access points from the perspective of the client device. In addition, transmissions by a client device can also be received by multiple access points in the mesh, for purposes of redundancy and reliability.

While there have been shown and described illustrative embodiments for coordinating best effort traffic to an associationless, overhead mesh of access points, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed in certain settings, such as a factory or warehouse, the techniques are not limited as such and can be deployed in any number of different settings.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
selecting, by an access point of an overhead mesh of access points in an area, a range of client identifiers;
sending, by the access point and via a beam cone transmitted in a substantially downward direction towards a floor of the area, a trigger signal that includes the range of client identifiers and prompts client devices having identifiers in that range to send best effort transmissions towards the overhead mesh;
merging, by the access point, contiguous ranges of client identifiers to be included in a single trigger signal, based on a determination that no responses were received in response to trigger signals for the contiguous ranges of client identifiers;
detecting, by the access point, a collision between the best effort transmissions of the client devices; and
adjusting, by the access point, the range of client identifiers so as to avoid future collisions between the best effort transmissions of the client devices.

2. The method as in claim 1, wherein the client devices that send the best effort transmissions randomly select resource units in which to send their best effort transmissions towards the overhead mesh.

3. The method as in claim 1, wherein detecting the collision between the best effort transmissions of the client devices comprises:
detecting a threshold amount of transmitted energy in the area at a particular time.

4. The method as in claim 1, wherein adjusting the range of client identifiers so as to avoid future collisions between the best effort transmissions of the client devices comprises:
dividing the range of client identifiers into two or more sub-ranges to be used in separate trigger signals.

5. The method as in claim 4, wherein the two or more sub-ranges partially overlap.

6. The method as in claim 1, further comprising:
sending a second trigger to a particular one of the client devices at a scheduled time that prompts the particular one of the client devices to send deterministic traffic towards the overhead mesh.

7. The method as in claim 1, wherein the range of client identifiers comprises media access control (MAC) addresses or Internet Protocol (IP) addresses.

8. The method as in claim 1, wherein the range of client identifiers comprises hash values.

9. The method as in claim 1, wherein the client devices comprise mobile robots.

10. An apparatus, comprising:
one or more network interfaces;
a processor coupled to the one or more network interfaces and configured to execute one or more processes; and
a memory configured to store a process that is executable by the processor, the process when executed configured to:
select a range of client identifiers;
send, via a beam cone transmitted in a substantially downward direction towards a floor of an area, a trigger signal that includes the range of client identifiers and prompts client devices having identifiers in that range to send best effort transmissions towards an overhead mesh of access points in the area;

merge, by the apparatus, contiguous ranges of client identifiers to be included in a single trigger signal, based on a determination that no responses were received in response to trigger signals for the contiguous ranges of client identifiers;

detect a collision between the best effort transmissions of the client devices; and adjust the range of client identifiers to avoid future collisions between the best effort transmissions of the client devices.

11. The apparatus as in claim 10, wherein the client devices that send the best effort transmissions randomly select resource units in which to send their best effort transmissions towards the overhead mesh.

12. The apparatus as in claim 10, wherein the apparatus detects the collision between the best effort transmissions of the client devices by:

detecting a threshold amount of transmitted energy in the area at a particular time.

13. The apparatus as in claim 10, wherein the apparatus adjusts the range of client identifiers so as to avoid future collisions between the best effort transmissions of the client devices by:

dividing the range of client identifiers into two or more sub-ranges to be used in separate trigger signals.

14. The apparatus as in claim 13, wherein the two or more sub-ranges partially overlap.

15. The apparatus as in claim 10, wherein the process when executed is further configured to:

send a second trigger to a particular one of the client devices at a scheduled time that prompts the particular one of the client devices to send deterministic traffic towards the overhead mesh.

16. The apparatus as in claim 10, wherein the range of client identifiers comprises media access control (MAC) addresses or Internet Protocol (IP) addresses.

17. The apparatus as in claim 10, wherein the range of client identifiers comprises hash values.

18. A tangible, non-transitory, computer-readable medium storing program instructions that cause an access point in an overhead mesh of access points in an area to execute a process comprising:

selecting, by the access point, a range of client identifiers;

sending, by the access point and via a beam cone transmitted in a substantially downward direction towards a floor of the area, a trigger signal that includes the range of client identifiers and prompts client devices having identifiers in that range to send best effort transmissions towards the overhead mesh;

merging, by the access point, contiguous ranges of client identifiers to be included in a single trigger signal, based on a determination that no responses were received in response to trigger signals for the contiguous ranges of client identifiers;

detecting, by the access point, a collision between the best effort transmissions of the client devices; and adjusting, by the access point, the range of client identifiers to avoid future collisions between the best effort transmissions of the client devices.

* * * * *

UNITED STATES PATENT AND TRADEMARK OFFICE
CERTIFICATE OF CORRECTION

PATENT NO. : 11,930,541 B2
APPLICATION NO. : 17/683833
DATED : March 12, 2024
INVENTOR(S) : Pascal Thubert et al.

It is certified that error appears in the above-identified patent and that said Letters Patent is hereby corrected as shown below:

In the Specification

Column 5, Line 52 please amend as shown:
deployed, such as mobile robots 302*a*-304*l* shown. In Column 7, Line 12 please amend as shown:
To prevent energy leakage between cones (e.g., between Column 21, Line 1 please amend as shown:
merge contiguous ranges of client Signed and Sealed this
Twenty-eighth Day of May, 2024

Katherine Kelly Vidal
*Director of the United States Patent and Trademark Office*